United States Patent [19]

Nielsen

[11] Patent Number: 5,897,644
[45] Date of Patent: Apr. 27, 1999

[54] METHODS AND APPARATUS FOR FIXED CANVAS PRESENTATIONS DETECTING CANVAS SPECIFICATIONS INCLUDING ASPECT RATIO SPECIFICATIONS WITHIN HTML DATA STREAMS

[75] Inventor: Jakob Nielsen, Atherton, Calif.

[73] Assignee: Sun Microsystems, Inc., Palo Alto, Calif.

[21] Appl. No.: 08/719,858

[22] Filed: Sep. 25, 1996

[51] Int. Cl.$^6$ .................................................. G06F 17/21
[52] U.S. Cl. .......................................................... 707/513
[58] Field of Search .................................. 345/340, 335, 345/326; 395/200.48, 200.6, 682; 382/161, 229; 706/12; 707/513

[56] References Cited

U.S. PATENT DOCUMENTS

| | | | |
|---|---|---|---|
| 5,513,342 | 4/1996 | Leong et al. | 345/340 |
| 5,572,643 | 11/1996 | Judson | 395/200.48 |
| 5,594,809 | 1/1997 | Kopec et al. | 382/161 |
| 5,689,585 | 11/1997 | Bloomberg et al. | 382/229 |
| 5,689,620 | 11/1997 | Kopec et al. | 706/12 |
| 5,724,506 | 3/1998 | Cleron et al. | 395/200.6 |
| 5,781,189 | 7/1998 | Holleran et al. | 345/335 |
| 5,784,619 | 7/1998 | Evans et al. | 395/682 |

FOREIGN PATENT DOCUMENTS

0661627A1  5/1995  European Pat. Off. .

OTHER PUBLICATIONS

IBM C/C++ Tools Version 2.0: "User Interface Class Library Reference", May 1993, IBM Part No. 61G1179, Denmark XP002056782, pp. 54, 400, 404, 534, 540, 659, 660–662.
IBM C/C++ Tools: "User Interface Class Library User's Guide, Version 2.01", Nov. 1993, IBM Part No. 82G3743, Denmark XP002056783, pp. 20, 54, 57, 59.
J. Seidman: "A Proposed Extension to HTML: Client–Side Image Maps", Network Working Group—RFC 1980, Aug. 1996, Http://www.cis.ohio–state.edu/rfc/rfc1980.txt, XP002056781, 6 Pages.
*Instant HTML Web Pages*, by Wayne Ause, Ziff–Davis Press, ISBN 1–56276–363–6, 1995, pp. 1–15.
"HTML 3.2 Features at a Glance", 7 pages, (http://www.w3.org/pub/WWW/MarkUp/Wilber/features.html).
"Hypertext MarkUp Language—2.0", rfc 1866, pp. 1–77, (http://www.cis.ohio–state.edu/htbin/rfc/rfc1866.html).

*Primary Examiner*—Mark R. Powell
*Assistant Examiner*—John L. Young
*Attorney, Agent, or Firm*—McDermott, Will & Emery

[57] ABSTRACT

Apparatus, methods, systems, and computer program products are disclosed for displaying fixed canvas presentations, defined using HTML data, on computer output devices of unknown sizes. The invention transforms the fixed canvas image to fit within a display view that of a size other than that of the display view used to construct the original image. This transformation maintains a page layout similar to that of the original but magnified or reduced to fit the available display area.

44 Claims, 10 Drawing Sheets

Figure 1b
(Prior Art)
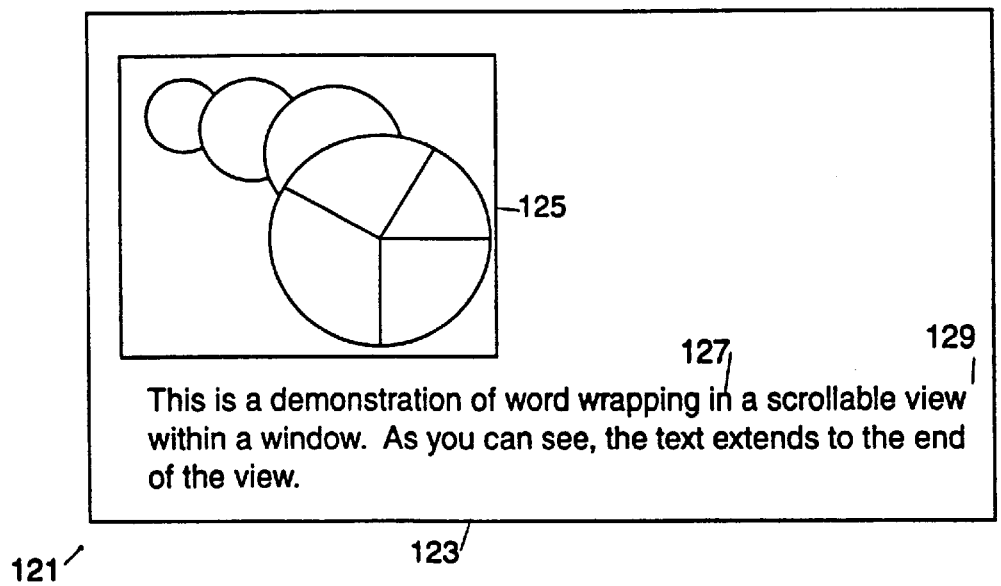
Figure 1c
(Prior Art)
Figure 1d
(Prior Art)
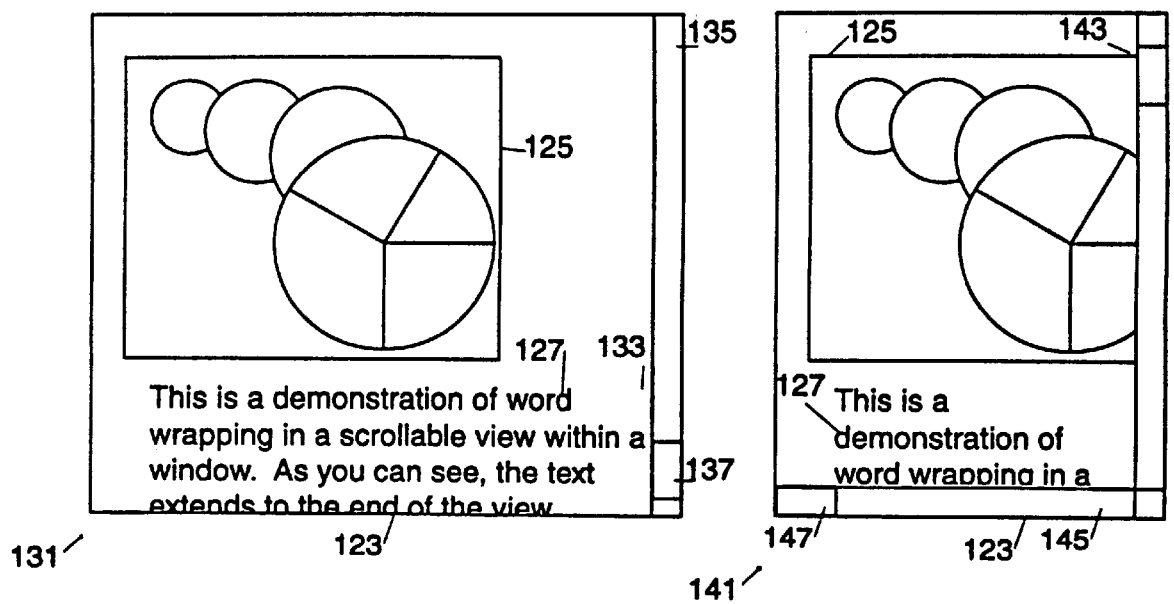

Figure 9a
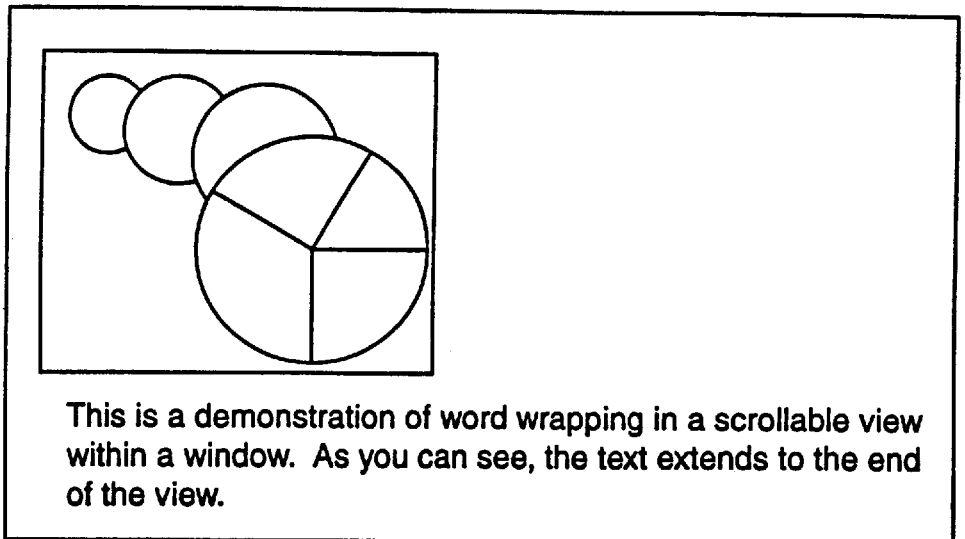
921   923
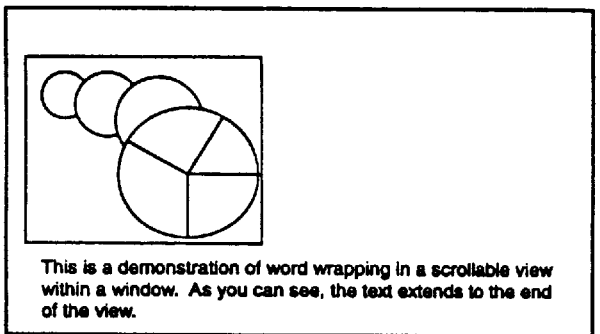
925   927
Figure 9b
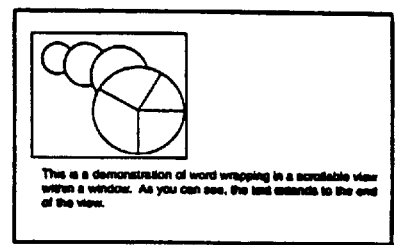
929   931
Figure 9c

METHODS AND APPARATUS FOR FIXED CANVAS PRESENTATIONS DETECTING CANVAS SPECIFICATIONS INCLUDING ASPECT RATIO SPECIFICATIONS WITHIN HTML DATA STREAMS

BACKGROUND OF THE INVENTION

1. Field of the Invention

This invention relates to the field of presenting data streams constructed using a hypertext markup language (HTML). Specifically, this invention is a new and useful method, apparatus, system, and computer program product for displaying fixed canvas presentations, defined using HTML, at sizes other than the size of the fixed canvas.

2. Background

Well-known computer programs allow a person to create a slide, overhead transparency or an image on a computer display that can be used to present information to others. One aspect of these programs is that each slide, transparency, or image is constructed for a fixed canvas (that of the slide, the transparency or computer display having a fixed width and height) in a what-you-see-is-what-you-get (WYSIWYG) manner. Thus, these applications are extremely well suited for creating presentations directed towards a known display medium. However, fixed canvas tools are not suited for presentations directed toward an unknown display medium such as a computer display device of unknown size that may not be large enough to display an image the size of the canvas.

One example of a class of programs that are well suited to presenting information on a variety of unknown display devices are those that process HTML data. These programs are generally termed world-wide-web (WWW) browser programs because of their wide use for browsing through data on the WWW. A goal of these programs is to present the information contained in an HTML data stream on a display in a scrollable view. As such, the browser program formats the displayed HTML information according to the browser program's page layout logic and does not necessarily recreate the layout intended by the author of the HTML data. Browser programs exist for many computer systems. Thus, a single HTML data stream can be utilized by many different computers. However, the prior art does not provide a means to achieve the same displayed image on differing size computer displays because the browser's page layout logic generates different results depending on the display area available and the available fonts and typography software. Thus, prior art WWW browsers, like the prior art presentation applications, are not well suited for presentations using display devices of unknown size.

The prior art does provide for minimal control of the page layout. The HTML <PRE> element allows an author to define monospaced textual areas with specified line breaks and white-space. However, if a sufficiently small area is used to present the HTML, the text within the <PRE> area will not be displayed because the browser does not wrap text in a <PRE> element nor does the browser reduce the contents of the <PRE> element to fit a small limited display area.

World Wide Web

The WWW is a massive hypertext system that a user accesses using a WWW browser application executing on a computer—an information access apparatus. The WWW browser apparatus communicates with, and is a client of, information provider apparatus such as server computers each computer executing server applications capable of communicating with the client browser application. These clients obtain information and services, in the form of web pages, from the server. These web pages are identified by unique universal resource locators (URL) and are usually specified using a markup language—generally a version of the hypertext markup language (HTML). HTML 2.0, is described in RFC1866 and can be found on the WWW at: "http://www.cis.ohio-state.edu/htbin/rfc/rfc1866.html". However, HTML is evolving and variants exist. For example, the HTML 3.2 proposal is found at "http://www.w3.org/pub/WWW/MarkUP/Wilbur/features.html".

The background of the WWW, WWW browser applications, and URLs is well described by reference to the first chapter of Instant HTML Web Pages, by Wayne Ause, Ziff-Davis Press, ISBN 1-56276-363-6, copyright 1995, pages 1–15, hereby incorporated by reference as illustrative of the prior art.

FIG. 1a illustrates an example of how a plurality of computers implement a client-server information access system. An information client system 101 communicates over a network 103 such as the internet 103 to a plurality of information server systems 105. The client system 101 encapsulates requests for services and information within an applicable internet protocol and passes the encapsulated requests to the internet 103 as indicated by an arrow 107. The internet 103 routes these requests to each of the plurality of information server systems 105 addressed within the request as indicated by a plurality of arrows 109. Each of the plurality of addressed information server systems 105 respond to the client system 101 with responses appropriate to the service or information requested by the client system 101. Once the client system 101 receives this information it is presented to the user by using an application program (for example, a WWW browser) executing on the client computer.

Hypertext documents, composed of HTML data, can be presented to a user by an application. The application processes the HTML data contained within the document to generate an image that can be displayed to a user on a computer display or tangible page. Unlike page description languages, such as PostScript, the "page" layout of HTML documents is dependent on the drawing area used to display the image described by the HTML data. Thus, HTML is used to describe hypertext documents that are portable from one computing platform to another and that do not need WYSIWYG functionality. The HTML concept is that of a scrolling page that can be resized as desired by the user. Thus, HTML based applications do not strive to achieve WYSIWYG functionality, but rather they strive to appropriately present information in drawing areas of different sizes and resolutions to the best of the browser's ability. Thus, an application that presents HTML data will use whatever drawing area is available to render the HTML data to best fit that given drawing area. To perform this function the application will automatically wrap lines, adjust the width and height of table cells and perform other drawing area dependent operations to best display the HTML document in the available drawing area.

FIGS. 1b–1d illustrate the results of this function. FIG. 1b illustrates an image, referred to by the general reference character 121, resulting from a HTML data stream. The image 121 is within a window 123 presented on a computer display device (not shown but such as a printer or video device). The image 121 includes a graphic 125 and a textual string 127. The textual string 127 is wrapped near an edge 129 of the window 123. Because the entire image 121 defined by the HTML data can be displayed in the window 123, there are no scrolling controls.

FIG. 1c illustrates an image, referred to by the general reference character 131, of the same HTML data stream where the window 123 has been narrowed. Again the graphic 125 is completely contained within the window 123. However, the textual string 127 has been wrapped near an edge 133 of the window 123 to fit the textual string within the horizontal bounds of the window 123. Because the textual string 127 now extends below the bottom of the window 123, the window 123 requires a user selectable control area (SCA) 135 to allow the user to vertically scroll the image 131 within the window 123. A thumb 137 within the SCA 135 both indicates the position of the image 131 in the window 123 and serves as a user control for the SCA 135 to position the image 131 within the window 123.

Finally, FIG. 1d illustrates an image, referred to by the general reference character 141, of the same HTML data stream where the window 123 has been further narrowed. This time, the graphic 125 is not able to be completely displayed and is clipped at an edge 143. Thus, the image 141 now requires an SCA 145 that controls horizontal scrolling of the display 141 within the window 123. This SCA 145 also has a thumb 147 that both indicates and controls the position of the image 141 within the window 123.

These figures illustrate the problems with prior art HTML processing techniques used to present information designed for a specific size display onto a display of a different size.

SUMMARY OF THE INVENTION

The present invention provides an economical, apparatus, method, system, and computer program product for displaying fixed canvas presentations on computer output devices of differing sizes. The invention specifies the size of the fixed canvas used to create the presentation and transforms (reducing or enlarging) the canvas and image (resulting from processing the HTML data stream) to fit on a display with a different size than the display used to create the original presentation.

One aspect of the invention is a computer controlled method for presenting a fixed canvas hypertext markup language (HTML) data stream on a device. The method first detects a canvas specification within the HTML data stream that contains information from which a height dimension, a width dimension, and an aspect ratio of said fixed canvas are determined. The method constructs a view having this aspect ratio on the device to present the HTML data stream. The method also determines a transformation that maps the HTML data stream onto said view. This transformation preserves the aspect ratio of the canvas. Finally, the method presents the HTML data stream onto said view in accordance with said transformation.

In another aspect of the invention, an information display system is disclosed for presenting a fixed canvas hypertext markup language (HTML) data stream on a computer controlled device. This system includes a determination mechanism configured to detect the canvas specification within the HTML data stream. The determination mechanism also derives a height dimension, a width dimension, and an aspect ratio of the fixed canvas. The system also includes a view construction mechanism that constructs a view having the aspect ratio on the computer controlled device. This view is used to present the HTML data stream. The system also includes a transformation determination mechanism that determines a transformation that maps said HTML data stream onto said view. This transformation preserves the aspect ratio of the fixed canvas. Finally, the system presents the HTML data stream onto the view in accordance with the transformation using a presentation mechanism.

In yet another aspect of the invention an apparatus for presenting a hypertext markup language (HTML) data stream formatted to a fixed canvas on a computer controlled device is disclosed. The apparatus includes a CPU and a memory. This apparatus includes a determination mechanism configured to detect the canvas specification within the HTML data stream. The determination mechanism also derives a height dimension, a width dimension, and an aspect ratio of the fixed canvas. The apparatus also includes a view construction mechanism that constructs a view having the aspect ratio on the computer controlled device. This view is used to present the HTML data stream. The apparatus also includes a transformation determination mechanism that determines a transformation that maps said HTML data stream onto said view. This transformation preserves the aspect ratio of the fixed canvas. Finally, the apparatus presents the HTML data stream onto the view in accordance with the transformation using a presentation mechanism.

Yet a further aspect of the invention is a computer program product embedded on a computer usable medium for causing a computer to present a hypertext markup language (HTML) data stream on a computer controlled device where the HTML data stream is formatted to a fixed canvas. When executed on the computer, the computer readable code causes a computer to effect a determination mechanism, a view construction mechanism, transformation determination mechanism, and a presentation mechanism having the same functions as the apparatus described above.

The foregoing and many other advantages of the present invention will no doubt become obvious to those of ordinary skill in the art after having read the following detailed description of the preferred embodiments that are illustrated in the various drawing figures.

DESCRIPTION OF THE DRAWINGS

FIGS. 1b–d illustrate typical images resulting from prior art processing of HTML data;

FIG. 9 illustrates the resulting images produced in accordance with a preferred embodiment.

DESCRIPTION OF THE PREFERRED EMBODIMENTS

Notations and Nomenclature

Figure 1A:
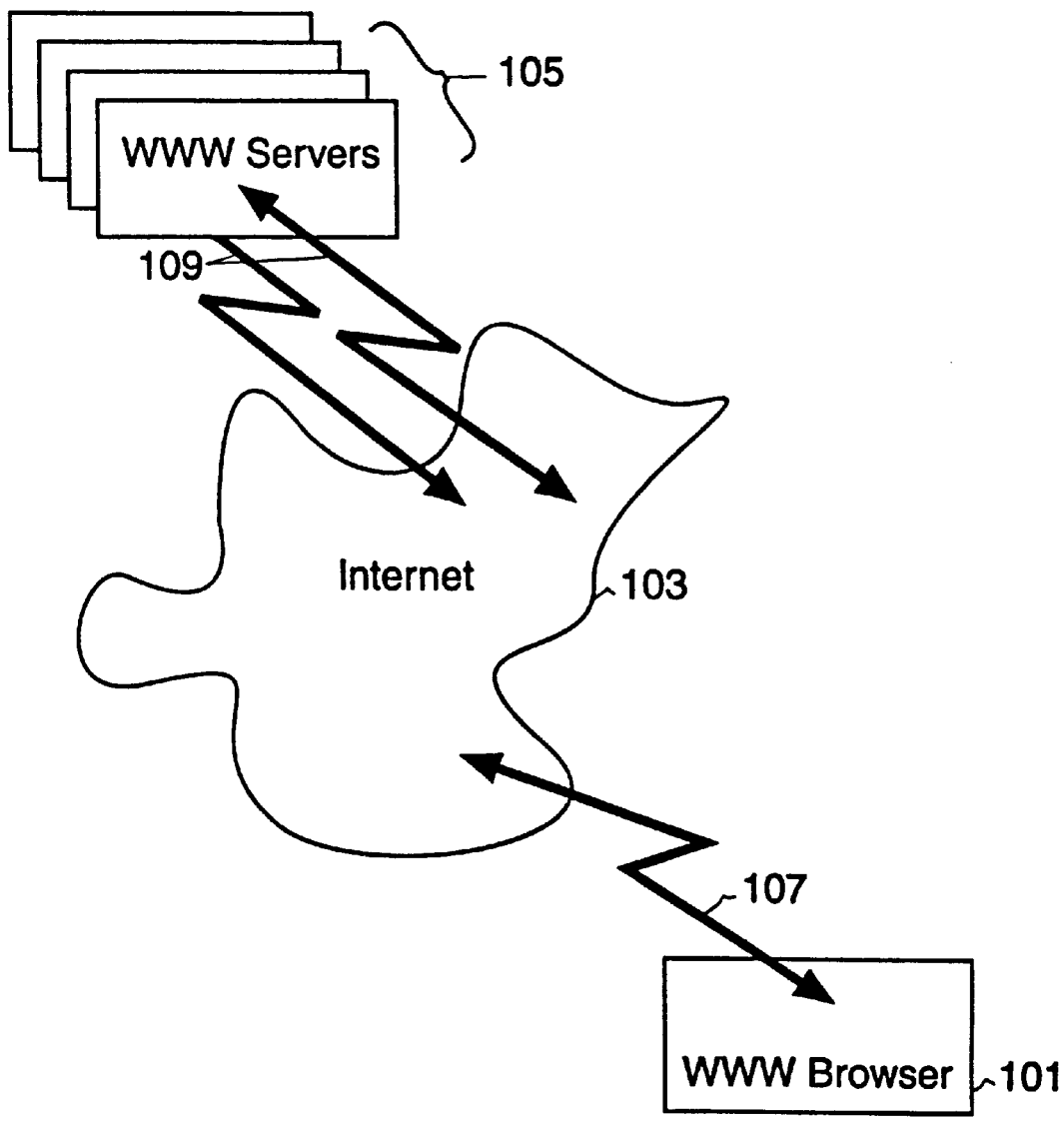
FIG. 1a illustrates a prior art client-server information access system.

The following "notations and nomenclature" are provided to assist in the understanding of the present invention and the preferred embodiments thereof.

Graphic—An HTML referenced non-textual element of an image (see below). "Graphic" is analogous to the HTML image or icon graphic. Thus, a graphic is a graphical image created by the HTML browser by reading graphical data such as a bitmap.

Graphical User Interface (GUI)—A user interface that allows a user to interact with a computer display by pointing at selectable control areas on the display and activating a command or computer operation associated with the selectable control area. GUIs are well known in the art.

Image—An image is the visual representation of the HTML data produced on a computer display device such as a printer or a display screen. The image is the end result of processing HTML data.

Points and Pixels—Font sizes are generally specified in points. There are approximately 72 points to an inch. Pixels are a measure of resolution for computer display devices.

Pointing device—A device that is responsive to a computer user's input that moves an indicator on a computer display screen. Such an indicator has an active point such that if the pointing device is activated (for example, by a button push for a mouse device) a command associated with the selectable control area covered by the active point is invoked. Pointing devices are generally used with graphical user interfaces.

Selectable control area—An area on a computer display that is sensitive to activation of a pointing device. A command or computer operation associated with the selectable control area is invoked on activation of the pointing device over the selectable control area. Most computer systems that provide a Graphical User Interface (GUI) also provide other methods for invoking these commands or computer operations such as keyboard function keys or command lines.

View—An area in a window where information is provided.

Window—An area, usually rectangular, on a computer display device controlled by an application.

WYSIWYG—An acronym for "What You See Is What You Get" and is commonly applied to word processing and graphical systems that have the capability to display information on a computer display that closely represents the same information when printed.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (for example, mechanical, chemical) physical signals to generate other desired physical signals.

The invention also relates to apparatus for performing these operations. This apparatus may be specially constructed for the required purposes, or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

Figure 2:
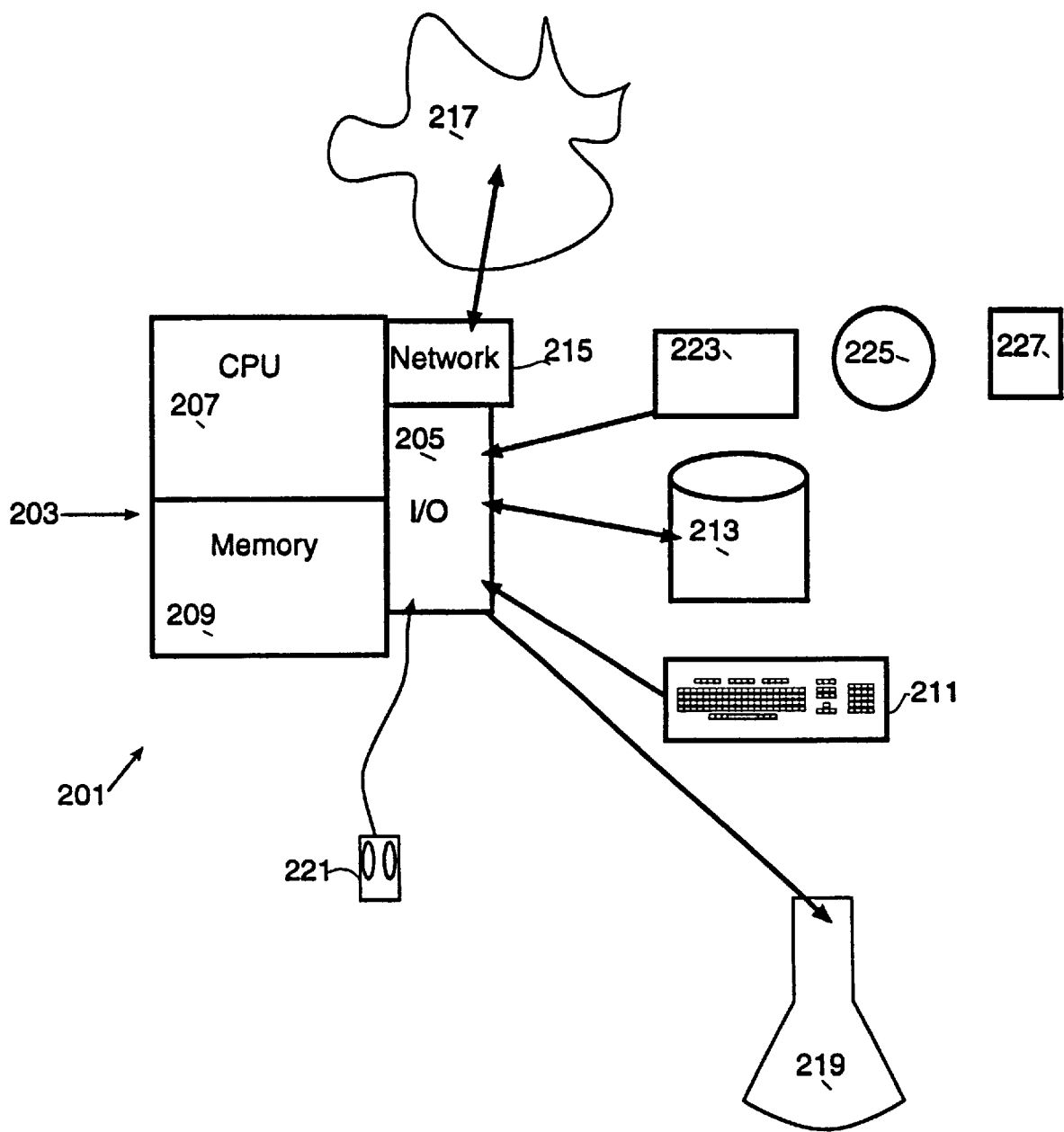
FIG. 2 illustrates a computer configured to support the invention in accordance with a preferred embodiment of the invention.

Some of the elements of a computer system, referred to by the general reference character 201, configured to support the invention are shown in FIG. 2 wherein a processor 203 is shown, having an Input/Output ("I/O") section 205, a central processing unit ("CPU") 207 and a memory section 209. The I/O section 205 is connected to a keyboard 211, a disk storage unit 213, a network interface 215 to provide access to a network 217, a display unit 219, a pointing device 221 and a CD-ROM drive unit 223. The CD-ROM unit 223 can read a CD-ROM medium 225 that typically contains programs and data 227. The CD-ROM unit 223 (using the CD-ROM medium 225) and the disk storage unit 213 comprise a file storage mechanism. Such a computer system is capable of executing information display applications that embody the invention.

Those skilled in the art will understand that the invention does not require a client server architecture similar to the one illustrated in FIG. 1a, nor does the invention require the network interface 215 or access to the network 217. Rather, the invention is directed toward presenting information to a user of a computer controlled display device independent of the source of the information. However, WWW browser applications are examples, without limitation, of applications that can use the invention. As such, the following describes the invention within the context of a preferred embodiment of a WWW browser application. However, one skilled in the art will understand that the invention generally can be applied to applications and apparatus that consume an HTML data stream to present information to a user of a computer controlled device. Further, one skilled in the art will understand that the problem exists for any fixed canvas presentation that is presented to a user of a device having a different size canvas than the canvas used to create the HTML.

Figure 3:
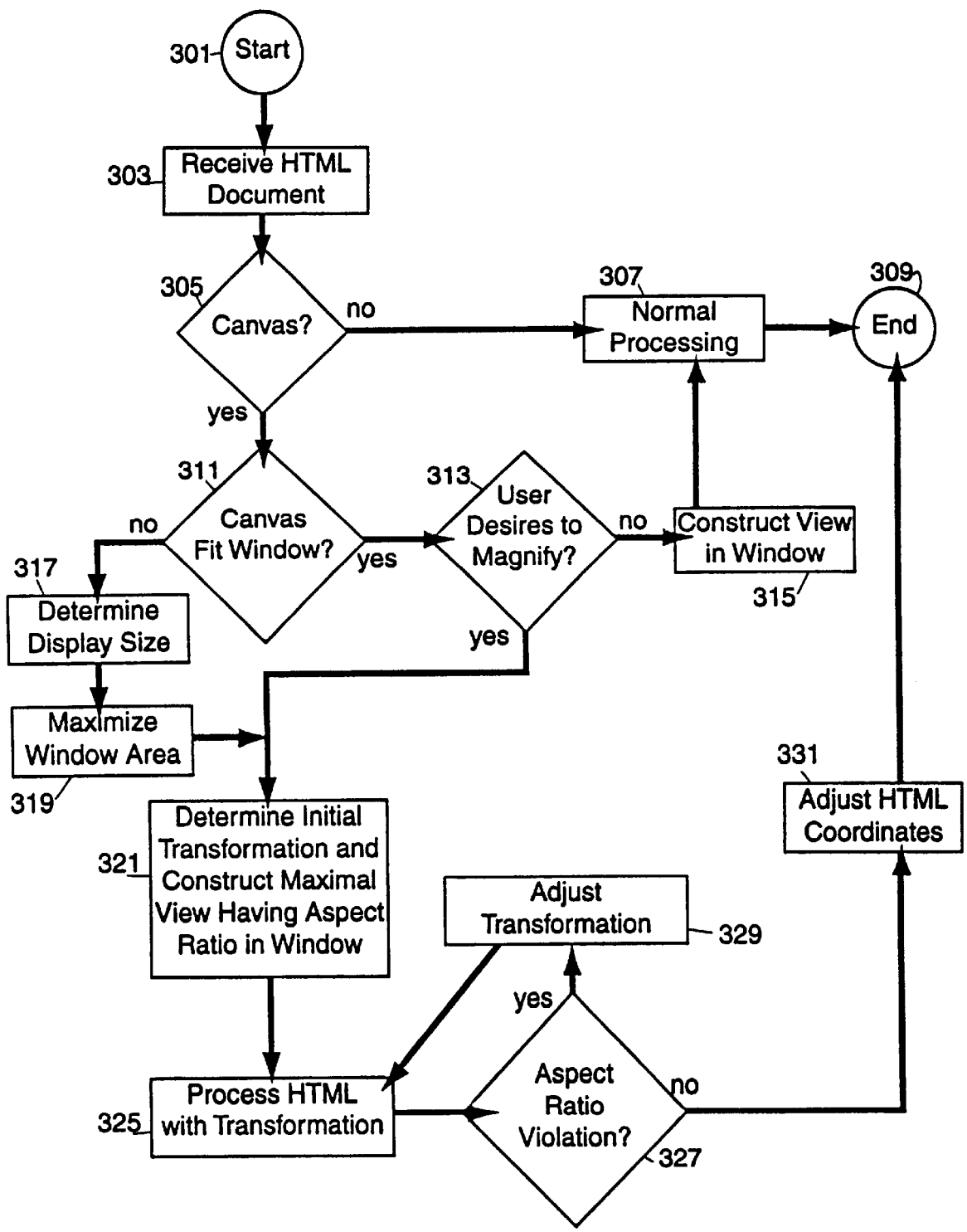
FIG. 3 illustrates the process used to display HTML in accordance with a preferred embodiment of the invention.

FIG. 3 illustrates the process used to display HTML in accordance with a preferred embodiment of the invention. This process is invoked by an HTML processing application. The process initiates at a "Start" terminal 301. A "Receive HTML Document" procedure 303 receives the HTML data stream from an input device such as a file system or network. At a "Canvas" decision procedure 305 the process determines whether the HTML data stream includes a canvas specification. This determination uses a parsing mechanism. In a preferred embodiment, this canvas specification is one or more attributes specified in the HTML <BODY>element. For example the HTML markups:

<BODY WIDTH=512 HEIGHT=400>
    <BODY WIDTH=512 HASPECT=0.78125>
    <BODY HEIGHT=400 WASPECT=1.28> all provide attributes that specify a canvas having a height of 400 pixels and a width of 512 pixels and a width-to-height aspect ratio of 1.28 (width/height). These attributes define a height dimension, a width dimension and an aspect ratio for the fixed canvas thus defining a canvas coordinate space. If the "Canvas" decision procedure 305 does not detect canvas attributes, the process continues to a "Normal Processing" procedure 307 that processes the HTML. After the HTML data stream is processed by the "Normal Processing" procedure 307, the process completes through an "End" terminal 309.

If the "Canvas" decision procedure 305 detects and extracts canvas attributes in the HTML <BODY> element, the process continues to a "Canvas Fit Window" decision procedure 311. This decision procedure 311 determines whether the canvas specified in the <BODY> element of the HTML data stream can be displayed within a window controlled by the HTML processing application. The canvas fits within the window if the horizontal dimension of the canvas is less than or equal to the horizontal area available for a view in the window and the vertical dimension of the canvas is less than or equal to the vertical area available for the view in the window. If the canvas fits within the window, the process continues to a "User Desires to Magnify" decision procedure 313. This decision procedure 313 checks a preference option to determine whether the user desires the canvas to be magnified to maximally fit within the window. If the preference option is to not magnify, or if the preference option is to magnify, but the canvas cannot be magnified within the window, the process continues to a "Construct View in Window" procedure 315. This procedure 315 sizes and constructs a view having the same size as the fixed canvas in the window. Optionally this procedure 315 reduces the size of the window so that the view is tightly surrounded by the HTML reader display overhead. Once the view is constructed, the process continues to the "Normal Processing" procedure 307. After the HTML data stream is processed by the "Normal Processing" procedure 307, the process completes through the "End" terminal 309.

If at the "Canvas Fit Window" decision procedure 311 the canvas does not fit within the accessible area of the existing display window of the HTML processor, the process continues to a "Determine Display Size" process 317 that accesses information about the display device containing the window to determine the maximal size available for the window. Then the process continues to a "Maximize Window Area" procedure 319. This procedure 319 expands the window used by the HTML processing application to the limit allowed by the device as determined from values obtained from the "Determine Display Size" procedure 317. The "Maximize Window Area" procedure 319 is further described below with regards to FIG. 4. Once the window is maximized, or if the process determines at the "User Desires to Magnify" decision procedure 313 to magnify, the process continues to a "Determine Initial Transformation and Construct Maximal View Having Aspect Ratio in Window" procedure 321. This procedure 321 is described below with regards to FIG. 5.

Once the transformation has been determined and the view constructed, the process continues at a "Process HTML with Transformation" process 325. This process 325 uses a presentation mechanism to present the image resulting from the processed HTML data stream within the view, but reduced or magnified according to the transformation. This process 325 is described below with respect to FIG. 6.

Next, the process continues to an "Aspect Ratio Violation" decision procedure 327. This procedure 327 is used because, as will be described below with respect to FIG. 7, the transformed font sizes are rounded. Thus, word wrapping of textual strings in the canvas is not completely predictable. If this decision procedure 327 detects that the display has overflowed the vertical limit of the view, the process continues to an "Adjust Transformation" procedure 329. If the decision procedure 327 does not detect a violation of the aspect ratio, the process continues to an "Adjust HTML Coordinates" procedure that transforms the appropriate coordinates specified by the HTML data to the coordinates of the transformed view. Finally the process completes through the "End" terminal 309.

Figure 4:
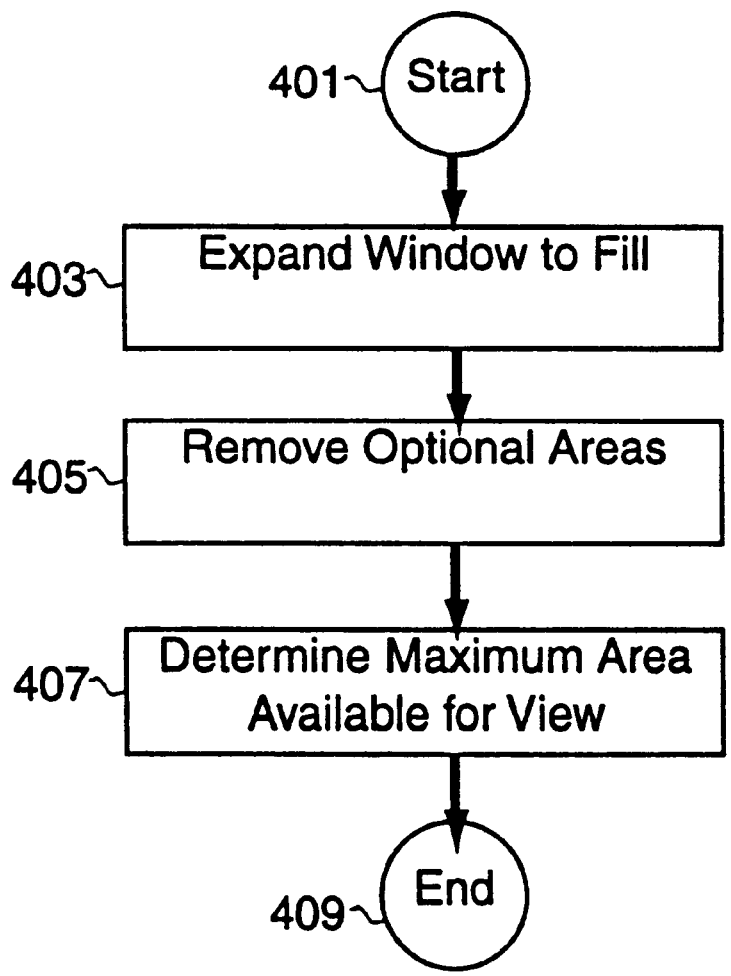
FIG. 4 illustrates the process used to maximize the window area in accordance with a preferred embodiment of the invention.

FIG. 4 illustrates the process used by the "Maximize Window Area" procedure 319. The procedure 319 initiates at a "Start" terminal 401 and continues to an "Expand Window to Fill" procedure 403 that maximizes the window to fill the accessible area of the display device by using values obtained from the "Determine Display Size" procedure 317. Next, a "Remove Optional Areas" procedure 405 removes scroll controls and other information displays and SCAs or any other window elements generated by the HTML processing application that are not needed to display the canvas so as to maximize the area available to the view. (Another embodiment of the invention allocates the entire display device and bypasses the windowing functions.) Then the process continues to a "Determine Maximum Area Available for View" procedure 407 that determines the largest area accessible for a view in the window. Finally the process completes through an "End" terminal 409.

Figure 5:
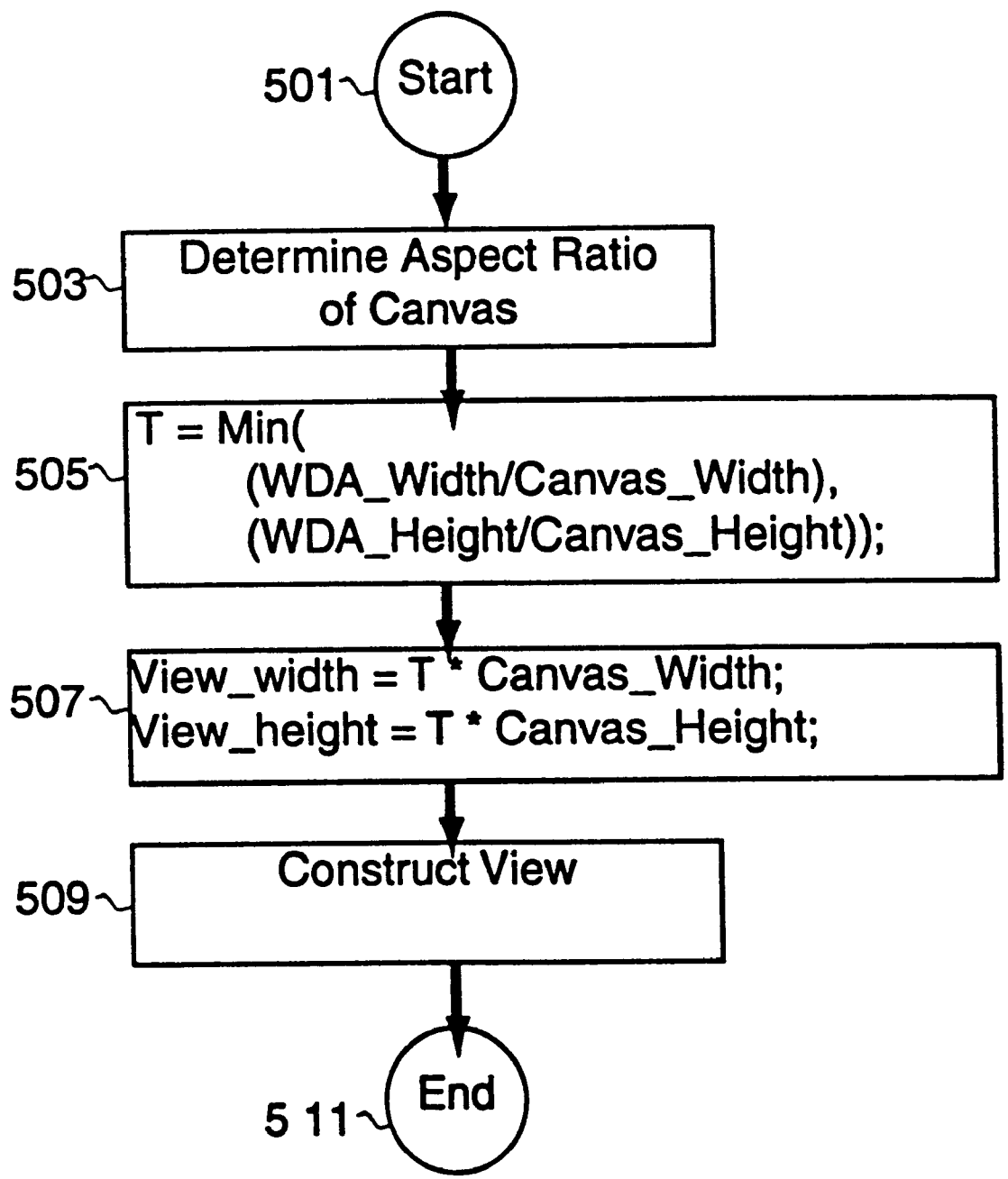
FIG. 5 illustrates the process used to determine the initial transformation and to construct a maximal view having the aspect ratio in the window in accordance with a preferred embodiment of the invention.

FIG. 5 illustrates the process used by the "Determine Initial Transformation and Construct Maximal View Having Aspect Ratio in Window" 321 procedure. The process enters at a "Start" terminal 501 and continues to a "Determine Aspect Ratio of Canvas" procedure 503. This procedure 503 uses the HASPECT or WASPECT attribute values if provided. HASPECT is the reciprocal of WASPECT. If neither of the xASPECT attributes are provided, the process calculates the WASPECT by taking the floating point ratio of Width divided by Height. Next, at a calculation procedure 505, the process determines the transformation required to map the image described by the HTML data into the view. This transformation "T" is determined by finding the minimum of two values. The first value is the width of the area of the window accessible for a view (WDA_Width) divided by the canvas width (Canvas_Width). The second value is the height of the area of the window accessible for a view (WDA_Height) divided by the canvas height (Canvas_Height). The Canvas_Height and Canvas_Width values are those provided by the Width and Height attributes of the <BODY> element or derived from the attributes provided. A subsequent calculation procedure 507 calculates the width and height of the view by applying the transformation to the canvas width and height respectively. Thus this procedure 507 generates the dimensions of the view. Next the process continues to a "Construct View" procedure 509 that allocates the appropriately dimensioned view in the window. Finally, the process completes through an "End" terminal 511.

Figure 6A:
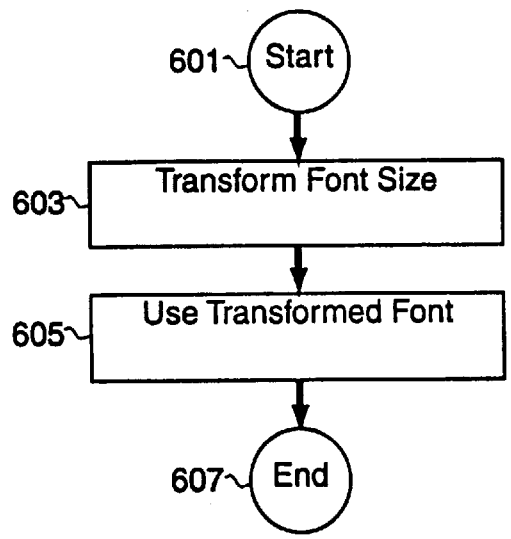
FIG. 6 illustrates a selection of processes used to image the HTML data stream in accordance with a preferred embodiment of the invention.
Figure 6B:
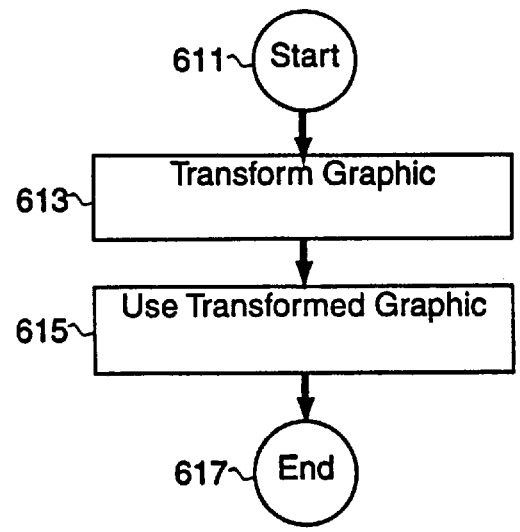
Figure 6C:
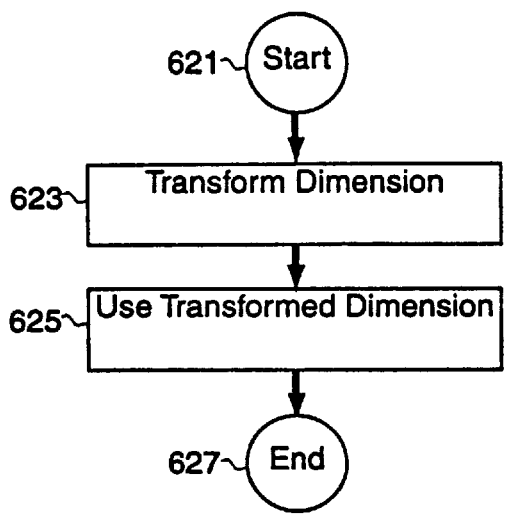

FIG. 6 illustrates a selection of the processes used to image the HTML data stream. Those skilled in the art will understand that similar processes may be applied to other aspects of the presentation mechanism used for HTML processing. The three processes illustrated in FIG. 6 are the font transformation process, the graphic transformation process, and the dimension transformation process.

The font transformation process begins at a "Start" terminal 601 at the invocation of a font. The HTML browser knows of a number of fonts of differing sizes. Each font contains a number of characters. These fonts are commonly selected by using special HTML elements (for example, <STRONG>, <TT>, <H1>, <PRE>, <CITE>, among others). HTML extensions may include additional elements or attributes that affect fonts. Regardless of how the fonts are specified in HTML, the browser detects when a font of a given original font point size is to be used. Next, at a "Transform Font Size" procedure 603 the process determines the correct transformed font size to use with the font. This is accomplished by multiplying the original font point size by the transformation to provide a transformed font point size in fractional points. Because fractional point size fonts are seldom rendered as clearly as integer point size fonts, a preferred embodiment of the invention rounds the transformed font point size to the nearest integer font point size. Next, a "Use Transformed Font" procedure 605 uses the fonts with the transformed sizes to display the image by presenting the characters within the font. The process completes through an "End" terminal 607.

This embodiment of the font size transformation process has a potential side effect of causing some text strings to be too long to fit in the canvas thus causing these text strings to be unexpectedly wrapped and possibly requiring an additional line. This additional line causes the length of the required canvas to increase and may cause the aspect ratio violation mentioned above. This situation is detected by the "Aspect Ratio Violation" decision procedure 327 of FIG. 3 that causes the "Adjust Transformation" procedure 329 to modify the transformation as described below for FIG. 7. Then, the HTML data stream is redisplayed under the new adjusted transformation crating a smaller image that will fit within the view. Another embodiment truncates the transformed font point size to the integer font point size. This embodiment produces a smaller font thus reducing the space required within the view and does not require an adjustment to the transformation.

Graphics are often referenced in HTML files. These graphics are accessed using HTML elements such as the <IMG> or <A> elements and are often in "JPEG" or "GIF" formats. These graphics need to be transformed. The graphic transformation process is initiated at a "Start" terminal 611 upon detection of a graphic in a JPEG, GIF or other graphic image format. The graphic is transformed by passing the pixel data making up the graphic through the transformation to magnify or reduce the graphic at a "Transform Graphic" procedure 613. Next at a "Use Transformed Graphic" procedure 615 the transformed graphic is applied to the view at a transformed coordinate. The process completes through the "End" terminal 627.

The dimension transformation process is used when an explicit or implied HTML dimension is detected. The process initiates through a "Start" terminal 621 and continues to a "Transform Dimension" procedure 623 that converts the HTML dimension into a number of pixels in the view. One aspect, among others, of HTML that uses this dimension transformation process includes the dimensions included in a COORDS attribute of the <AREA> element. In the HTML data these values are in pixels units thus, these values also must be transformed by "T", that was determined at the step 505 of FIG. 5. Similar transformations must be made for values such as points, picas, inches, centimeters, millimeters, and em units as will be apparent to one skilled in the art. The transformed dimension is then used in a "Use Transformed Dimension" procedure 625 and the process completes through an "End" terminal 627.

Those skilled in the art will understand that other HTML elements include dimensions or parameters that must be transformed prior to presentation in the view.

Figure 7:
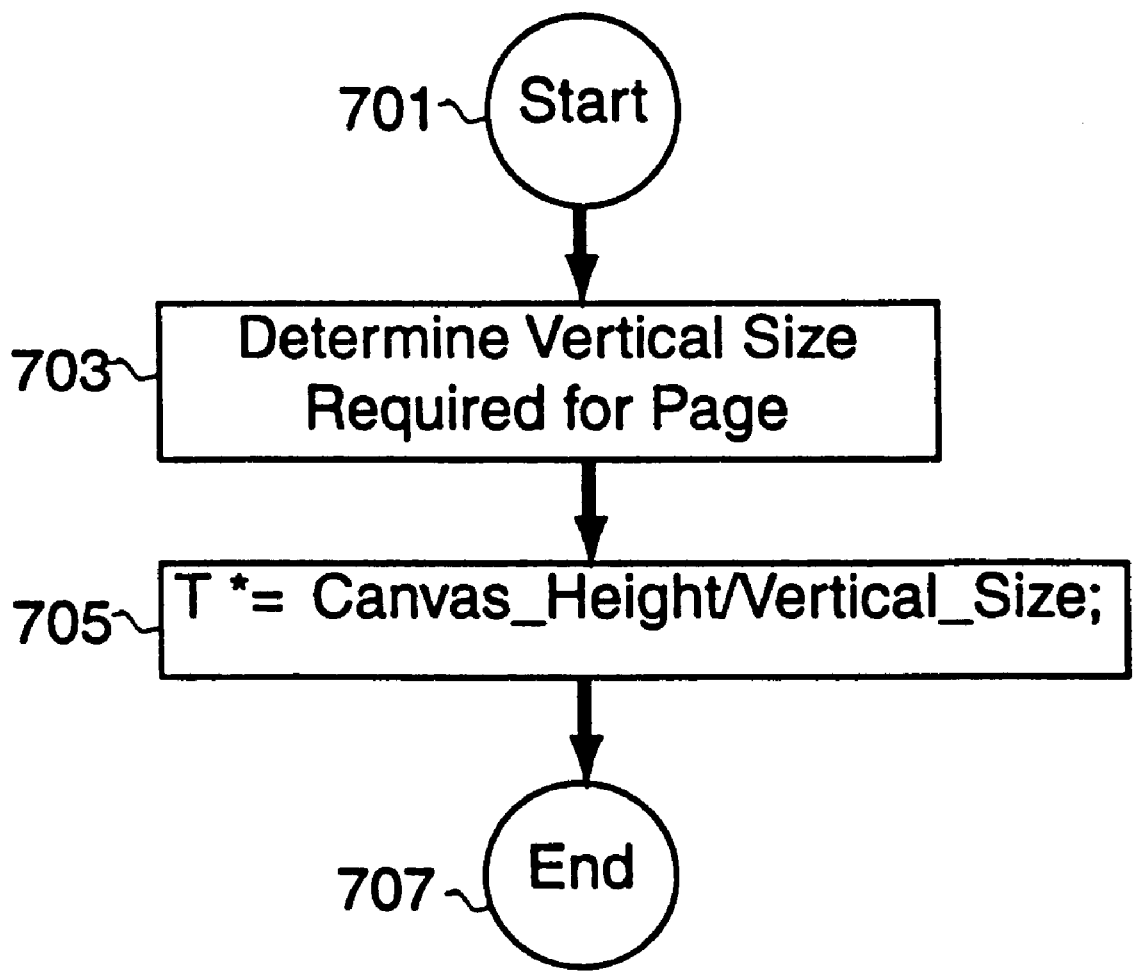
FIG. 7 illustrates the process used to adjust the transformation in response to an aspect ratio violation in accordance with a preferred embodiment of the invention.

FIG. 7 illustrates the process used to adjust the transformation if the image resulting from the HTML document extends beyond the vertical limit of the view and is invoked at the "Adjust Transformation" procedure 329 of FIG. 3. The process enters a "Start" terminal 701 and continues to a "Determine Vertical Size Required for Page" procedure 703 that obtains the vertical coordinates with respect to the view where the image would have ended if the view was large enough to hold the entire image. This value is the Vertical_Size. Next, the transformation "T", that was determined at the step 505 of FIG. 5, is adjusted. This adjustment is performed at a calculation step 705 by multiplying the transformation "T" by the ratio of Canvas_Height/Vertical_Size or the equivalent calculation. Finally, the procedure completes through an "End" terminal 707. This adjusted transformation is then used to redisplay a slightly smaller image in the view through the "Process HTML with Transformation" procedure 325 as shown in FIG. 3.

Figure 8:
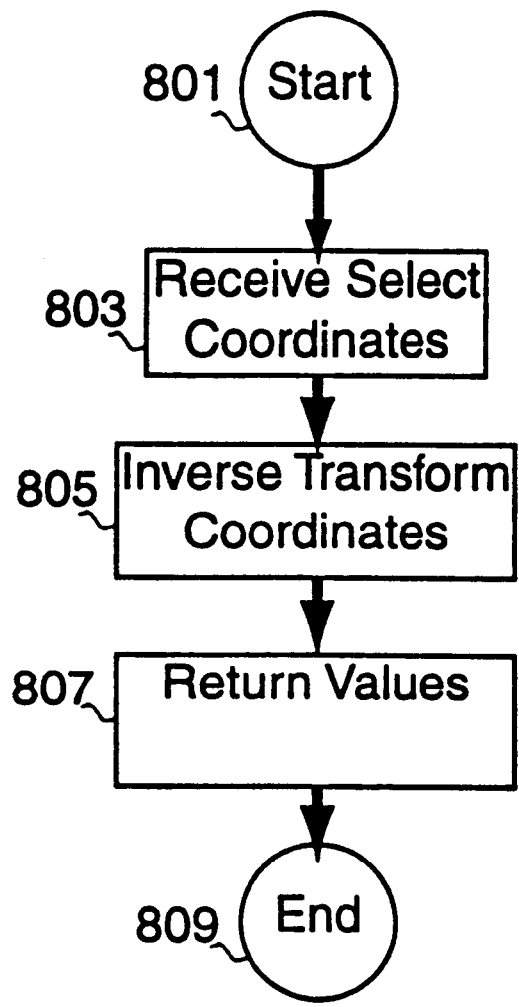
FIG. 8 illustrates the process used to convert a view coordinate into a fixed canvas coordinate in accordance with a preferred embodiment of the invention.

FIG. 8 illustrates the process used to convert a view coordinate returned from the view (as directed by a user selection operation) to a coordinate expected by the HTML server. This coordinate comprises an x-y coordinate pair. This view coordinate is a display coordinate relative to the view coordinate space that resulted from the transformation of the HTML. Because the server does not know of the transformation or of the view coordinate space, any user selection operations on the transformed image that emit screen pixel coordinates to the server must emit coordinates that have been inverse transformed back into the canvas coordinate space. Thus, the view coordinate returned by the user selection operation must be inverse transformed into a canvas coordinate within the canvas coordinate space before being emitted to the server. FIG. 8 illustrates this process. When a pixel coordinate is to be emitted to the server the process initiates at a "Start" terminal 801 and continues to a "Receive Select Coordinates" procedure 803 that receives the view coordinate of the pixel associated with the cursor when the user activated the selection function. Next, an "Inverse Transform Coordinates" procedure 805 performs the inverse transformation of the view coordinate to the canvas coordinate expected by the server. The inverse transformation is performed by multiplying the X and Y components of the view coordinate corresponding by the reciprocal of the "T" transform. The values generated by the "Inverse Transform Coordinates" procedure 805 are then returned at the "Return Values" procedure 807 and the process completes through the "End" terminal 809.

FIG. 9 illustrates the results of the invention when displaying a fixed canvas HTML document in windows of differing sizes. When an image 921 is presented in a window 923 large enough to contain the fixed canvas, the fixed canvas HTML data stream results in the image 921 being the same as the image 121 of FIG. 1b. The identical HTML will produce a reduced image 925 with the same aspect ratio as that of the image 921 when presented in a smaller window 927 instead of the wrapped and scrolled image 131 of FIG. 1c. Finally, the identical HTML will produce an even further reduced image 929 in a yet smaller window 931. Thus, unlike the images displayed in FIGS. 1b–d, the images presented by a WWW browser utilizing the invention maintain the same "look" as the original image 921 but transformed in size.

Those skilled in the art will understand that the invention as described above teaches a method, system, apparatus, and computer program product that provides the facility to display fixed canvas images defined by HTML data on display devices of various sizes.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for presenting a hypertext markup language (HTML) data stream on a device, said HTML data stream formatted to a fixed canvas, said method comprising steps of:
   (a) detecting a canvas specification within said HTML data stream, said canvas specification containing information from which a height dimension, a width dimension, and an aspect ratio of said fixed canvas are determined;
   (b) constructing a view having said aspect ratio on said device to present said HTML data stream;
   (c) determining a transformation to map said HTML data stream onto said view, said transformation preserving said aspect ratio; and
   (d) presenting said HTML data stream onto said view in accordance with said transformation.

2. The computer controlled method of claim 1 wherein step (a) further comprises extracting said canvas attributes from an HTML <BODY> element.

3. The computer controlled method of claim 1 wherein step (b) further comprises sizing said view to said canvas specification.

4. The computer controlled method of claim 1 wherein step (b) further comprises maximizing said view.

5. The computer controlled method of claim 1 wherein step (b) further comprises:
   (b1) maximizing a window having a plurality of window elements;
   (b2) determining an accessible area in said window; and
   (b3) maximizing said view in said accessible area.

6. The computer controlled method of claim 5 wherein step (b1) further comprises removing one of said plurality of window elements from said window.

7. The computer controlled method of claim 1 wherein step (c) further comprises selecting a transformed font point size by operating on an original font point size of a character using said transformation, and step (d) further comprises presenting said character at said transformed font size.

8. The computer controlled method of claim 7 wherein step (d) further comprises rounding said transformed font size to a nearest integer font point size.

9. The computer controlled method of claim 8 further comprising:
   (e) detecting an aspect ratio violation; and
   (f) adjusting said transformation.

10. The computer controlled method of claim 7 wherein step (d) further comprises truncating said transformed font size to an integer font point size.

11. The computer controlled method of claim 1 wherein said fixed canvas has a canvas coordinate space, said method further comprising steps of:
   (e) receiving a view coordinate corresponding to a user selection operation within said view;
   (f) performing an inverse transformation on said view coordinate to transform said view coordinate into a canvas coordinate in said canvas coordinate space; and
   (g) applying said canvas coordinate.

12. An information display system for presenting a hypertext markup language (HTML) data stream on a computer controlled device, said HTML data stream formatted to a fixed canvas, said system comprising:
   a determination mechanism configured to detect a canvas specification within said HTML data stream, said canvas specification containing information from which a height dimension, a width dimension, and an aspect ratio of said fixed canvas are determined;
   a view construction mechanism configured to construct a view having said aspect ratio on said computer controlled device, said view used to present said HTML data stream;
   a transformation determination mechanism configured to determine a transformation that maps said HTML data stream onto said view, said transformation preserving said aspect ratio of said fixed canvas; and
   a presentation mechanism configured to present said HTML data stream onto said view in accordance with said transformation.

13. The information display system of claim 12 wherein the determination mechanism further comprises a parsing mechanism configured to extract said canvas attributes from an HTML <BODY> element.

14. The information display system of claim 12 wherein the view construction mechanism further comprises a sizing mechanism configured to size said view to said canvas specification.

15. The information display system of claim 12 wherein the view construction mechanism further comprises a maximization mechanism configured to maximize said view on said computer controlled device.

16. The information display system of claim 12 wherein the view construction mechanism further comprises:
   a window maximization mechanism configured to maximize a window having a plurality of window elements;
   an area determination mechanism configured to determine an accessible area in said window; and
   a view maximization mechanism configured to maximize said view in said area.

17. The information display system of claim 16 wherein the window maximization mechanism further comprises an element removal mechanism configured to remove one of said plurality of window elements from said window.

18. The information display system of claim 12 wherein the transformation determination mechanism further comprises a selection mechanism configured to select a transformed font point size based on said transformation of an original font point size of a character, and the presentation mechanism further comprises a character presentation mechanism configured to present said character at said transformed font size.

19. The information display system of claim 18 wherein the presentation mechanism further comprises a rounding mechanism configured to round said transformed font size to a nearest integer font point size.

20. The information display system of claim 19 further comprising:
(e) an aspect violation detection mechanism configured to detect an aspect ratio violation; and
(f) a transformation adjustment mechanism configured to adjust said transformation responsive to said aspect ratio violation.

21. The information display system of claim 18 wherein the presentation mechanism further comprises a truncation mechanism configured to truncate said transformed font size to an integer font point size.

22. The information display system of claim 12 wherein said fixed canvas has a canvas coordinate space, said system further comprising:
(e) a coordinate reception mechanism configured to receive a view coordinate corresponding to a user selection operation within said view;
(f) an inverse transformation mechanism configured to perform an inverse transformation on said view coordinate to transform said view coordinate into a canvas coordinate in said canvas coordinate space; and
(g) an application mechanism configured to apply said canvas coordinate.

23. An information display apparatus for presenting a hypertext markup language (HTML) data stream on a computer controlled device, said HTML data stream formatted to a fixed canvas, said apparatus having a central processing unit (CPU), a memory, and further comprising:
a determination mechanism configured to detect a canvas specification within said HTML data stream, said canvas specification containing information from which a height dimension, a width dimension, and an aspect ratio of said fixed canvas are determined;
a view construction mechanism configured to construct a view having said aspect ratio on said computer controlled device, said view used to present said HTML data stream;
a transformation determination mechanism configured to determine a transformation that maps said HTML data stream onto said view, said transformation preserving said aspect ratio of said fixed canvas; and
a presentation mechanism configured to present said HTML data stream onto said view in accordance with said transformation.

24. The information display apparatus of claim 23 wherein the determination mechanism further comprises a parsing mechanism configured to extract said canvas attributes from an HTML <BODY> element.

25. The information display apparatus of claim 23 wherein the view construction mechanism further comprises a sizing mechanism configured to size said view to said canvas specification.

26. The information display apparatus of claim 23 wherein the view construction mechanism further comprises a maximization mechanism configured to maximize said view on said computer controlled device.

27. The information display apparatus of claim 23 wherein the view construction mechanism further comprises:
a window maximization mechanism configured to maximize a window having a plurality of window elements;
an area determination mechanism configured to determine an accessible area in said window; and
a view maximization mechanism configured to maximize said view in said area.

28. The information display apparatus of claim 27 wherein the window maximization mechanism further comprises an element removal mechanism configured to remove one of said plurality of window elements from said window.

29. The information display apparatus of claim 23 wherein the transformation determination mechanism further comprises a selection mechanism configured to select a transformed font point size based on said transformation of an original font point size of a character, and the presentation mechanism further comprises a character presentation mechanism configured to present said character at said transformed font size.

30. The information display apparatus of claim 29 wherein the presentation mechanism further comprises a rounding mechanism configured to round said transformed font size to a nearest integer font point size.

31. The information display apparatus of claim 30 further comprising:
(e) an aspect violation detection mechanism configured to detect an aspect ratio violation; and
(f) a transformation adjustment mechanism configured to adjust said transformation responsive to said aspect ratio violation.

32. The information display apparatus of claim 29 wherein the presentation mechanism further comprises a truncation mechanism configured to truncate said transformed font size to an integer font point size.

33. The information display apparatus of claim 23 wherein said fixed canvas has a canvas coordinate space, said system further comprising:
(e) a coordinate reception mechanism configured to receive a view coordinate corresponding to a user selection operation within said view;
(f) an inverse transformation mechanism configured to perform an inverse transformation on said view coordinate to transform said view coordinate into a canvas coordinate in said canvas coordinate space; and
(g) an application mechanism configured to apply said canvas coordinate.

34. A computer program product comprising:
a computer usable storage medium having computer readable code embodied therein for causing a computer to present a hypertext markup language (HTML) data stream on a computer controlled device, said HTML data stream formatted to a fixed canvas, said computer readable code comprising;
computer readable program code devices configured to cause said computer to effect a determination mechanism configured to detect a canvas specification within said HTML data stream, said canvas specification containing information suitable from which a height dimension, a width dimension, and an aspect ratio of said fixed canvas are determined;
computer readable program code devices configured to cause said computer to effect a view construction mechanism configured to construct a view having said aspect ratio on said computer controlled device, said view used to present said HTML data stream;
computer readable program code devices configured to cause said computer to effect a transformation determination mechanism configured to determine a transformation that maps said HTML data stream onto said view, said transformation preserving said aspect ratio of said fixed canvas; and
computer readable program code devices configured to cause said computer to effect a presentation mechanism configured to present said HTML data stream onto said view in accordance with said transformation.

35. The computer program product of claim 34 wherein the determination mechanism further comprises computer readable program code devices configured to cause said computer to effect a parsing mechanism configured to extract said canvas attributes from an HTML <BODY> element.

36. The computer program product of claim 34 wherein the view construction mechanism further comprises computer readable program code devices configured to cause said computer to effect a sizing mechanism configured to size said view to said canvas specification.

37. The computer program product of claim 34 wherein the view construction mechanism further comprises computer readable program code devices configured to cause said computer to effect a maximization mechanism configured to maximize said view on said computer controlled device.

38. The computer program product of claim 34 wherein the view construction mechanism further comprises:
   computer readable program code devices configured to cause said computer to effect a window maximization mechanism configured to maximize a window having a plurality of window elements;
   computer readable program code devices configured to cause said computer to effect an area determination mechanism configured to determine an accessible are in said window; and
   computer readable program code devices configured to cause said computer to effect a view maximization mechanism configured to maximize said view in said area.

39. The computer program product of claim 38 wherein the window maximization mechanism further comprises computer readable program code devices configured to cause said computer to effect an element removal mechanism configured to remove one of said plurality of window elements from said window.

40. The computer program product of claim 34 wherein the transformation determination mechanism further comprises computer readable program code devices configured to cause said computer to effect a selection mechanism configured to select a transformed font point size based on said transformation of an original font point size of a character, and the presentation mechanism further comprises computer readable program cod e devices configured to cause said computer to effect a character presentation mechanism configured to present said character at said transformed font size.

41. The computer program product of claim 40 wherein the presentation mechanism further comprises computer readable program code devices configured to cause said computer to effect a rounding mechanism configured to round said transformed font size to a nearest integer font point size.

42. The computer program product of claim 41 further comprising:
   (e) computer readable program code devices configured to cause said computer to effect an aspect violation detection mechanism configured to detect an aspect ratio violation; and
   (f) computer readable program code devices configured to cause said computer to effect a transformation adjustment mechanism configured to adjust said transformation responsive to said aspect ratio violation.

43. The computer program product of claim 40 wherein the presentation mechanism further comprises computer readable program code devices configured to cause said computer to effect to truncation mechanism configured to truncate said transformed font size to an integer font point size.

44. The computer program product of claim 34 wherein said fixed canvas has a canvas coordinate space, said system further comprising:
   (e) computer readable program code devices configured to cause said computer to effect a coordinate reception mechanism configured to receive a view coordinate corresponding to a user selection operation within said view;
   (f) computer readable program code devices configured to cause said computer to effect an inverse transformation mechanism configured to perform an inverse transformation on said view coordinate to transform said view coordinate into a canvas coordinate in said canvas coordinate space; and
   (g) computer readable program code devices configured to cause said computer to effect an application mechanism configured to apply said canvas coordinate.

* * * * *